Jan. 9, 1962 S. W. TWITCHELL ET AL 3,016,240
APPARATUS FOR FEEDING SHEET MATERIAL
Filed Oct. 7, 1958 9 Sheets-Sheet 1

United States Patent Office 3,016,240
Patented Jan. 9, 1962

3,016,240
APPARATUS FOR FEEDING SHEET MATERIAL
Sherman W. Twitchell, Contoocook, and John B. Bradicich, Warner, N.H., assignors to FMC Corporation, a corporation of Delaware
Filed Oct. 7, 1958, Ser. No. 765,849
14 Claims. (Cl. 271—11)

This invention relates to improvements in feeding sheet material, such as cardboard or the like, to machines for staying box blanks and has for an object the provision of novel means for feeding individual sheets in succession from supply stacks without interruption in changing from one supply stack to another.

In feeding sheet material to machines for performing subsequent operations on the sheet material, such for example as in feeding cardboard blanks to staying machines in the manufacture of set-up boxes, the sheet material is usually placed in a stack on a tray and the tray in turn placed in the supply magazine for the machine. Since it is frequently desirable to operate such machines at a relatively high rate of speed, it is likewise desirable to supply the sheet material to the machine in a relatively high stack so as to minimize the number of loadings.

In accordance with the present invention the sheet material is fed to the machine in a high stack on a tray and after the stack on one tray is depleted the empty tray moves up to a holding or "stored" position at the top until such time as it is convenient for the attendant to return to reload the tray. The trays are carried by endless conveyor means which continue to supply sheets from a succeeding tray while the prior empty tray or trays are held in the stored position. The stored trays do not interfere with the feeding of sheets from the succeeding trays to the machine. This fully automatic operation eliminates the need of an attendant to be at the machine at any specified time or to wait for a tray to be emptied and thus eliminates wasted, non-productive waiting time.

In accordance with a further aspect of the invention, the sheets are adapted to be individually removed from the stack and positive separating means in the form of a gate is provided to insure that only the outermost sheet is removed from the stack at a time. The gate includes a pair of members spaced apart a distance corresponding to the thickness of one of the sheets. The gate is adapted to be moved into engagement with the outermost sheet of the stack adjacent the leading edge thereof and means is provided for moving the leading edge of the outermost sheet through the spacing between the pair of members of the gate to positively separate the outermost sheet from the stack. To increase the speed of operation, the outermost sheet is continuously moved in an advancing direction from its original position on the stack to the feed rolls of the machine. In the preferred form of the invention vacuum cups work in conjunction with the gate to assure positive separation of individual blanks and in this way the need for conventional vacuum relief valves, stripper fingers, air blasts or other complicated mechanisms is avoided. The sheet-elevating system provides for a continuous supply at the vacuum cup level at all times.

After the sheets are separated from the supply stack and fed into the staying machine, they are formed into set-up boxes and deposited on a delivery conveyor for discharge from the machine. The staying machine frequently forms a component of the box-wrapping system and the staying machine is positioned at the end or side of a wrapper conveyor to deliver set-up boxes to an operator for assembly with adhesive-coated sheets or wrappers, such for example as shown in Lange et al., Patent No. 2,705,905 or in automatic box-wrapping systems of the type shown in copending application, Serial No. 498,914, filed April 4, 1955 by William F. Andresen, Jr. and Roy H. Schempp, issued January 6, 1959 as United States Patent No. 2,867,158. In box-wrapping systems of the foregoing type, it is frequently necessary to manufacture a supply of set-up boxes without subsequent assembly with wrappers or to delay their assembly with wrappers until some future time. Since the staying machine is mounted as a component of the complete box-wrapping system, it is necessary to change the direction of feed from the delivery conveyor so that the set-up boxes will not be fed into the remainder of the box-wrapping system. The novel features of the delivery conveyor for the set-up boxes on the staying machine are described and claimed in application Serial No. 854,204, filed November 19, 1959, which application is a division of the present application.

For a more detailed disclosure of the invention and for further objects and advantages thereof, reference may be had to the following description taken in conjunction with the accompanying drawings in which.

Figure 1:
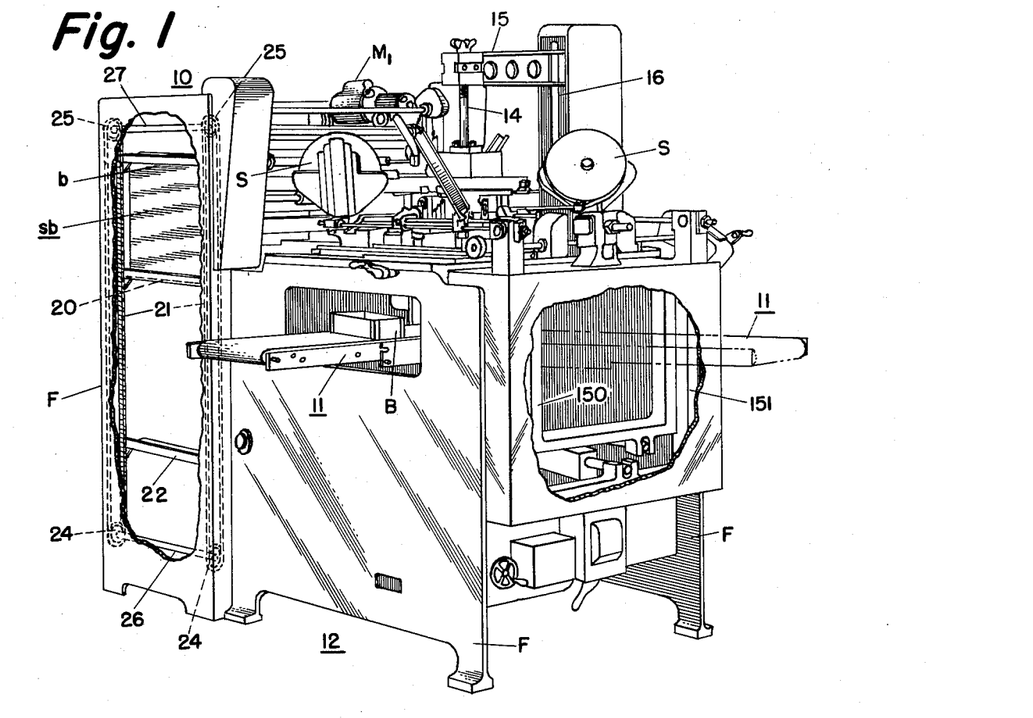
FIG. 1 is a perspective view with portions broken away of a staying machine embodying the present invention.

Referring to FIG. 1, the improved sheet feeding system 10 and conveyor 11 have been applied to a staying machine 12 for transforming box blanks *b* into set-up boxes B. The machine 12 is of the type generally referred to in the art as a quad stayer, by reason of the fact that stay strips are applied to all four corners of the box concurrently. The portion of the machine 12 for bending the sheet material or box blanks and applying the stays to the corners while the blank is in folded position is generally similar to the staying machine shown in Davis et al., Patent No. 728,086. The cardboard sheets or blanks *b* are arranged in stacks *sb* at one side of the machine and are adapted to be fed in succession, as later to be described in detail, to an operating station beneath a plunger 14. The plunger 14 is carried by a cross-head 15 which in turn is supported for reciprocating vertical movement by the upper end of a pair of slide rods 16. The drive mechanism for cyclically operating the slide rods 16 and the pressers (not shown) for the stay strips are disposed within frame F of the machine as later to be described.

At each of the four corners of the machine is a presser for applying stay strips from each of the adjacent stay rolls S. The pressers may be of the type disclosed in the aforesaid Davis patent for applying stays with the adhesive of the water-activated type or they may include heating provisions for applying stays of the heat-activated type.

Figure 2A:
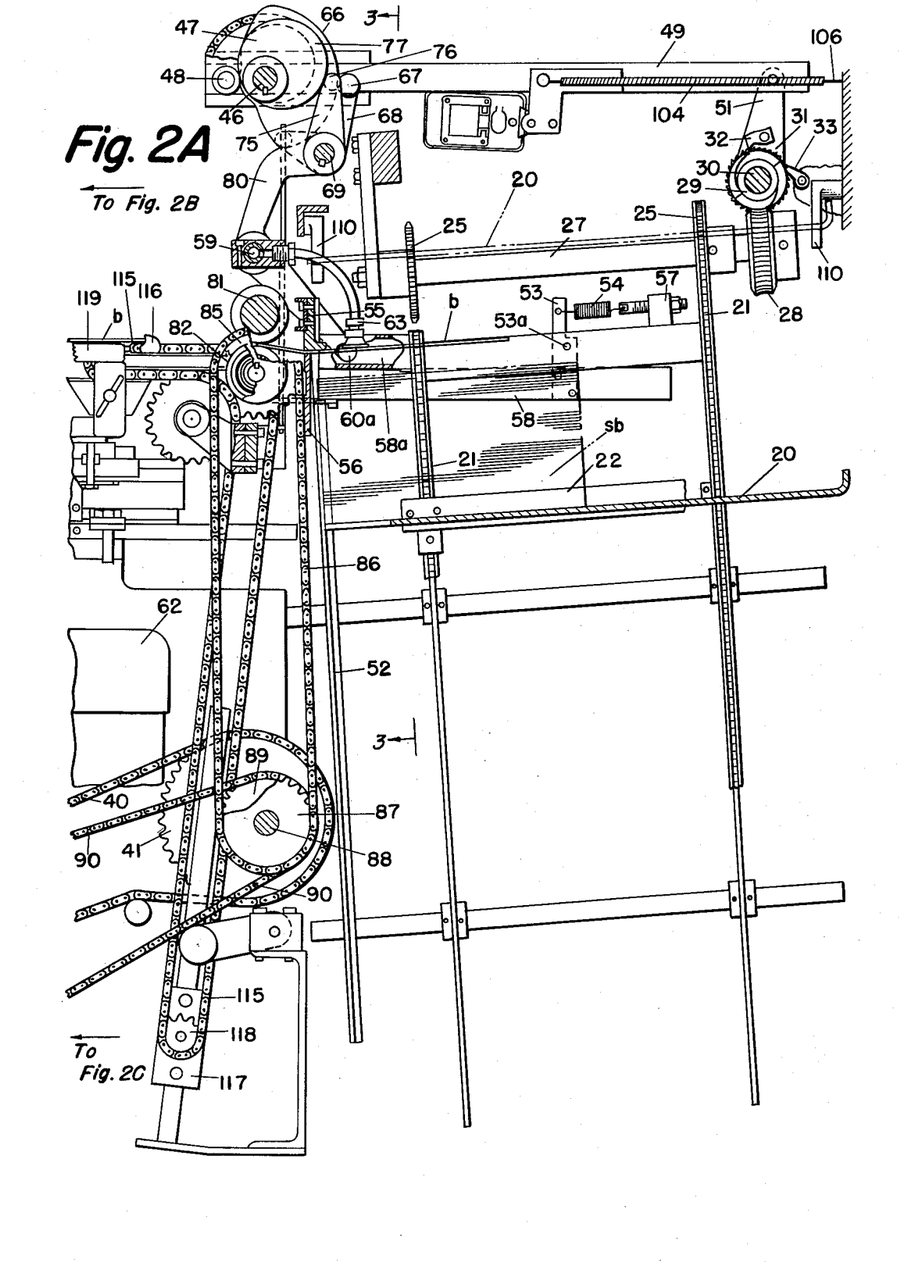
FIGS. 2A–2C comprise a side elevation view partially in section and with certain portions broken away of the staying machine shown in FIG. 1, the legends showing how the three FIGS. 2A, 2B and 2C fit together.
Figure 3:
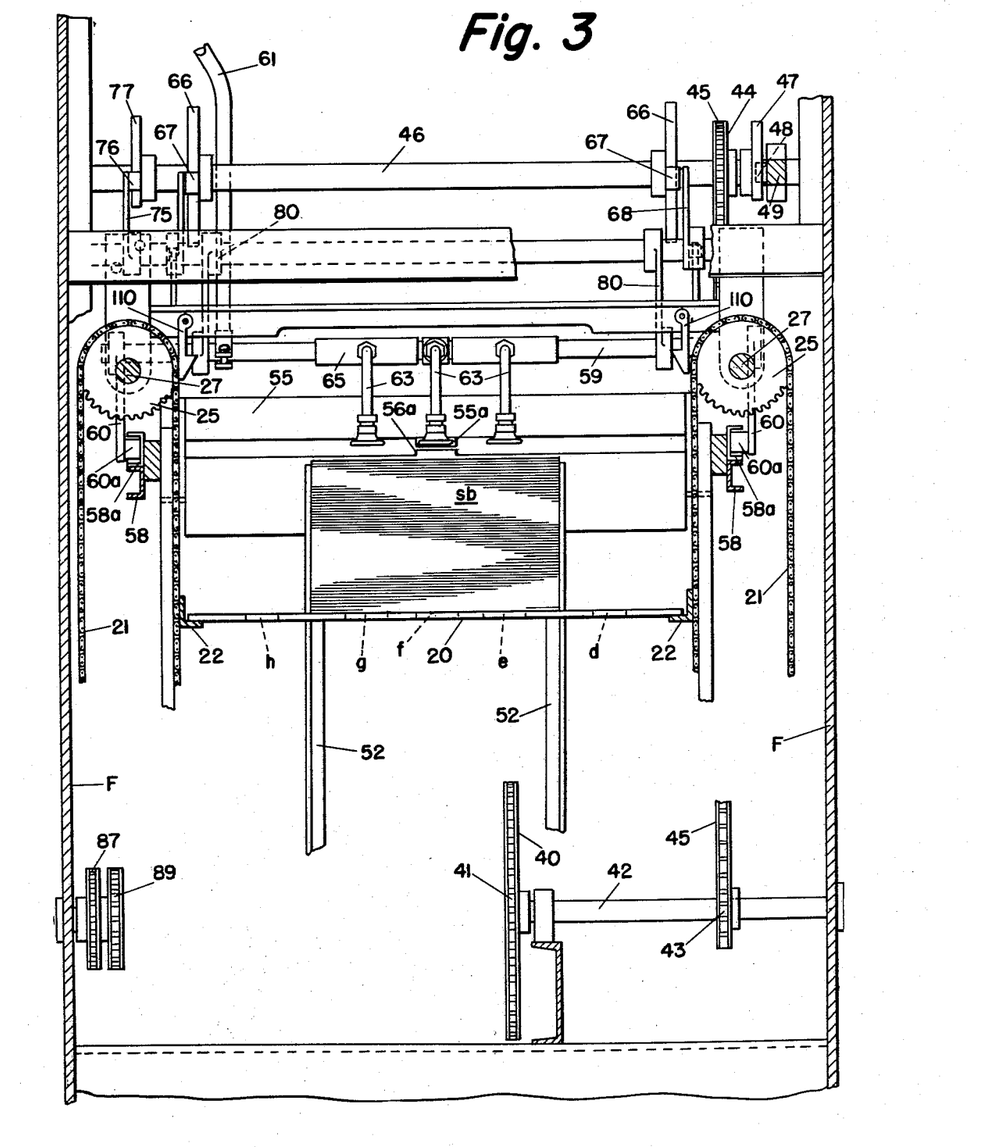
FIG. 3 is an end elevation view of the sheet material supply and feeding mechanism looking in the direction of the arrows 3—3 in FIG. 2A.

Referring to FIGS. 1, 2A and 3, the sheet material or blanks b are adapted to be placed in stacks sb on trays 20 preparatory to being placed in the sheet feeding system 10. The sheets may be rectangular and subsequently corner notched before bending and the stays are applied to form box blanks as described in copending application, Serial No. 574,405, filed March 28, 1956 by Bailey et al., issued June 16, 1959 as United States Patent No. 2,890,630, or the sheet material may be pre-notched before the blanks are placed on the trays 20. It is to be understood that the present machine 12 may be provided with the corner-cutting mechanism disclosed in said Bailey et al. application. However, the present invention will be described in connection with box blanks on which the corners have been precut.

As may be seen in FIGS. 1, 2A and 3, the trays 20 are adapted to be carried by an elevating mechanism comprising spaced pairs of endless chains 21, 21 disposed at opposite sides of the supply mechanism. Each pair of chains 21 is provided with angle members 22 which are adapted to receive the trays 20. The endless chains 21 are adapted to pass over sprockets 24 at their lower ends and sprockets 25 at their upper ends, the sprockets 24 being interconnected by a shaft 26 and the sprockets 25 being interconnected by a shaft 27 as shown in FIG. 1. Each of the shafts 27 is provided with a worm wheel 28 which is adapted to be driven from worms 29 respectively carried by a shaft 30 at the opposite ends thereof. The opposite ends of the worm shaft 30 are also provided with ratchet wheels 31, one of which is shown, FIG. 2A, and is adapted to be engaged by an operating pawl 32. One of the ratchet wheels 31 is adapted to be engaged by a holding pawl 33 to prevent reverse rotation of shaft 30 when pawl 32 returns to elevating position. The holding pawl 33 may be carried by a sprocket wheel, not shown, which idles on the near end of shaft 30, and is adapted to be driven from a separate operator, such as a handcrank or motor $M_1$, FIG. 1, for rapidly raising the elevating chain 21. The normal means of operating the elevating chains 21 is derived from the operating pawl 32 as now to be described.

Figure 2B:
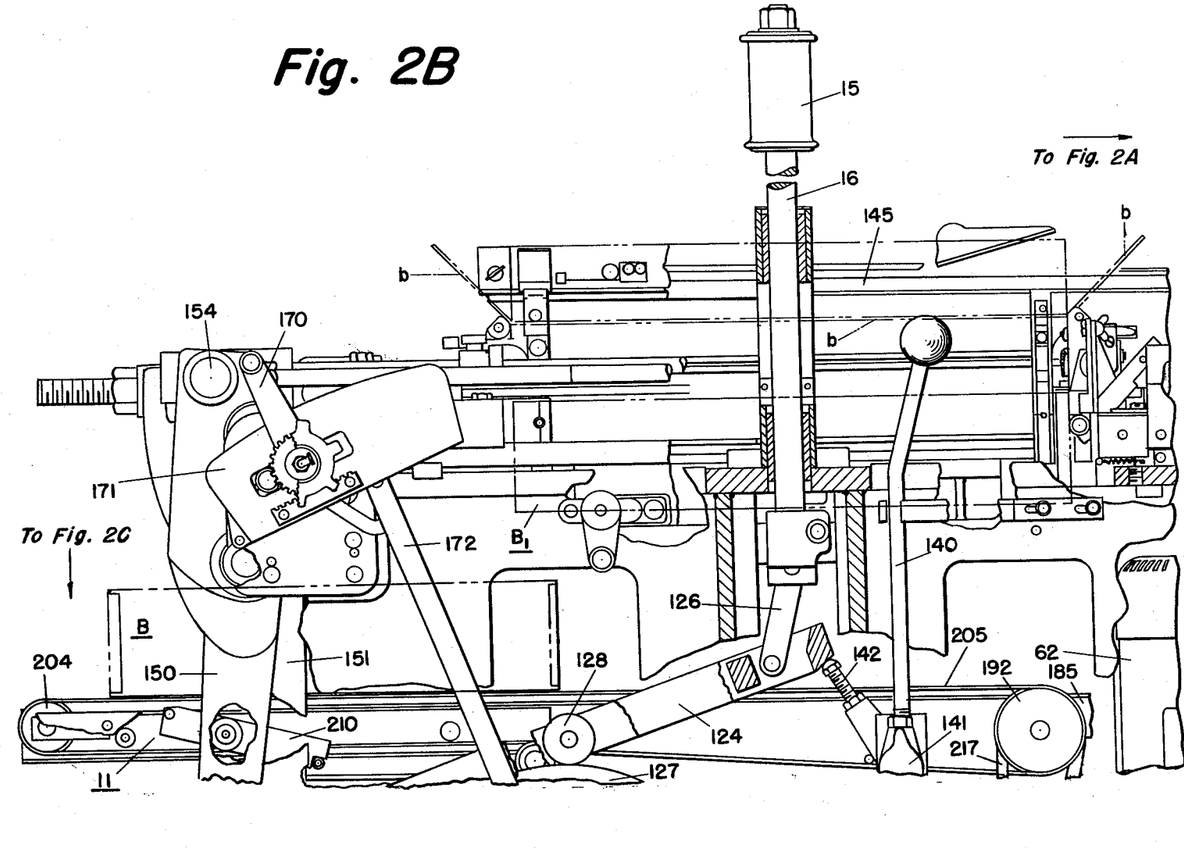
Figure 2C:
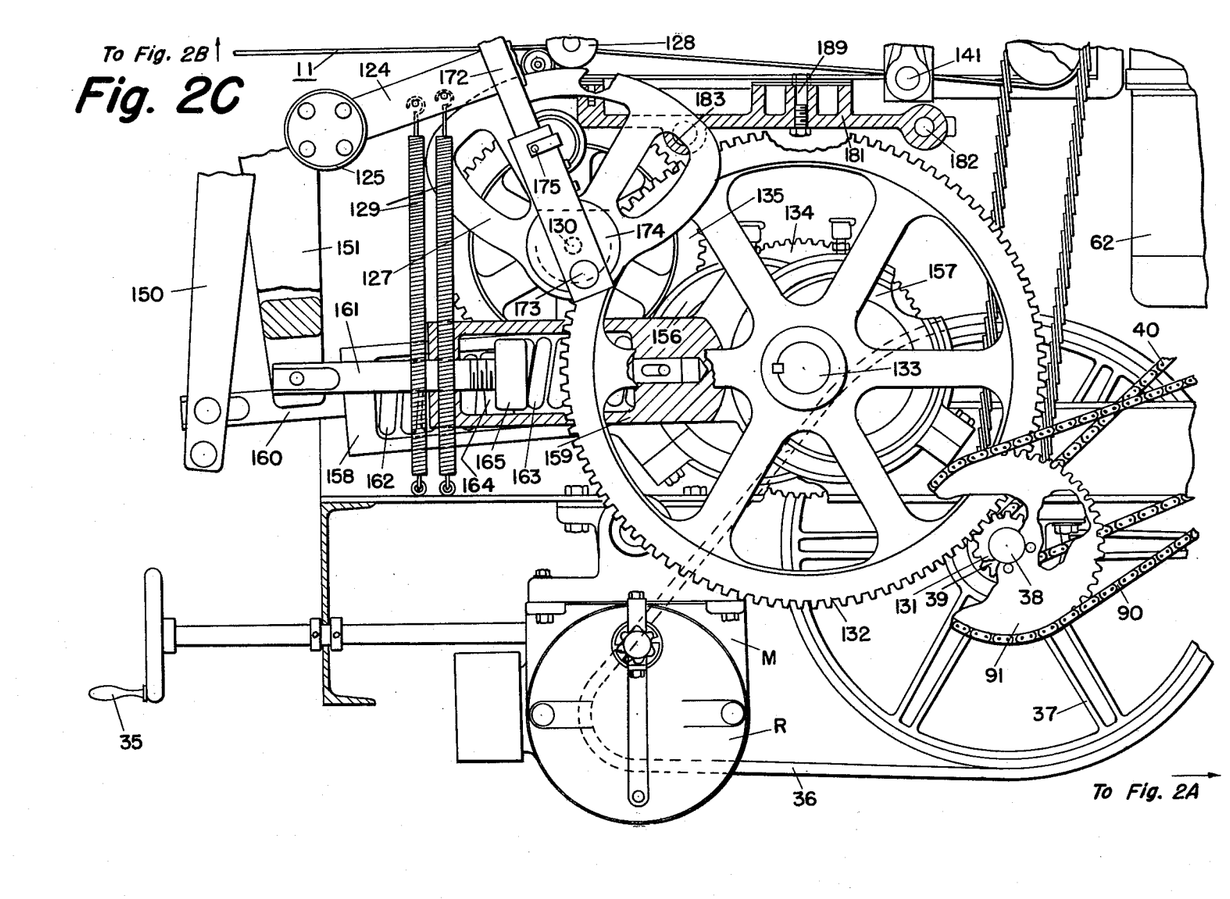
Figure 5:
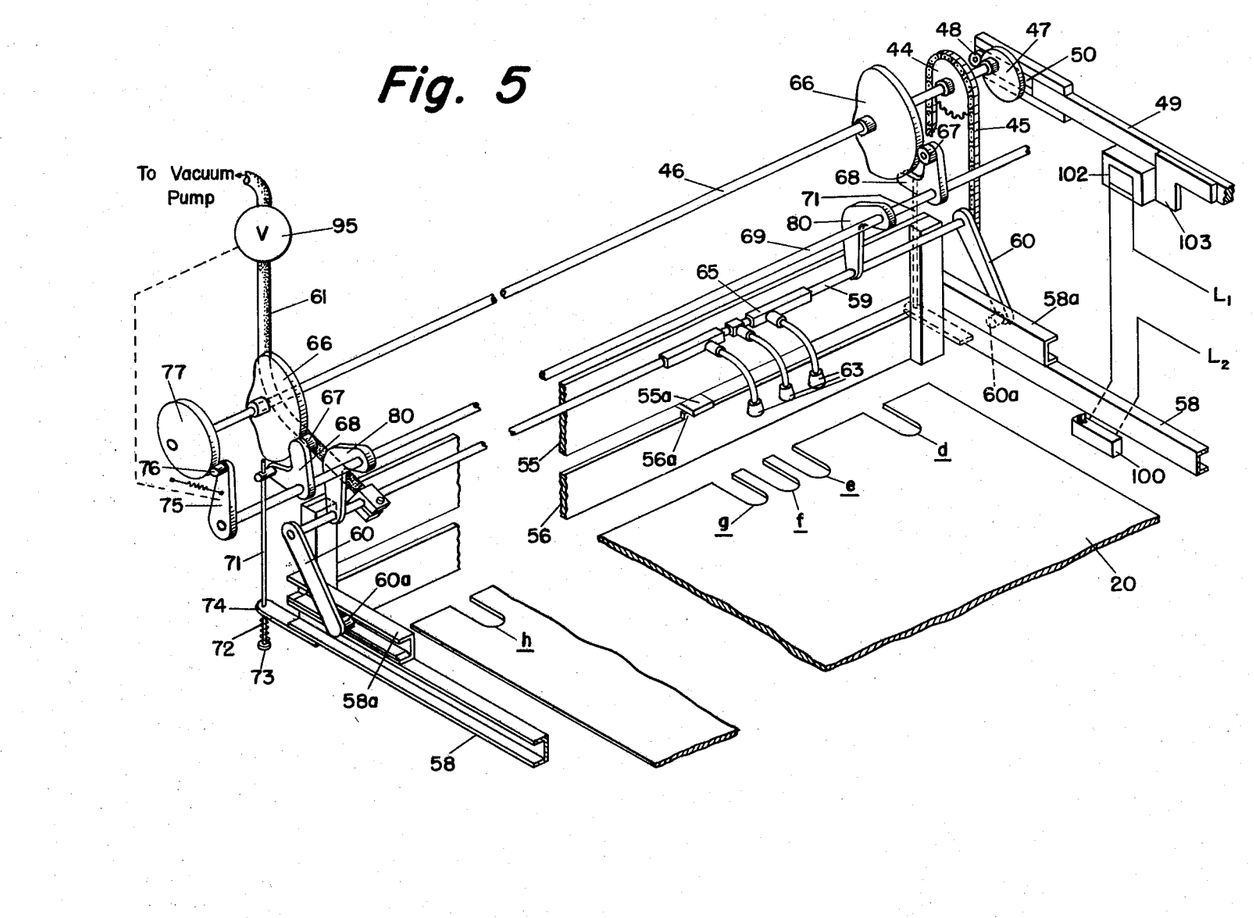
FIG. 5 is a perspective view of the sheet transfer mechanism.

The main drive for the staying machine is provided by a motor M, FIG. 2C, which is preferably provided with an adjustable Reeves drive R of the type well-known in the art. Such drive may be adjusted by the crank 35 FIG. 2C. The drive from the motor M is by way of belt 36 to pulley wheel 37 which is keyed to a main drive shaft 38, the opposite ends of which are journalled in the opposite sides of the frame F. The drive shaft 38 is provided with a sprocket 39, connected by way of chain 40 to a sprocket wheel 41 which, in turn, is carried at one end of a shaft 42, FIG. 3 which extends only part way between the side frames of the machine F, FIG. 3. On the opposite end of shaft 42 is a sprocket wheel 43 which is adapted to be connected by a chain 45 to a sprocket wheel 44 on the upper drive shaft 46, FIGS. 3 and 5. Secured to shaft 46 at the right hand end thereof as shown in FIGS. 2A, 3 and 5 is an eccentric cam 47, which is adapted to be engaged by a cam follower 48 which is carried at the end of an operating arm 49. The arm 49 has an opening 50, FIG. 5, to permit the shaft 46 to extend therethrough and be journalled in the side frame of the machine. The rear end of arm 49 is pivotally connected to a link 51 which, in turn, is pivoted at its opposite end on shaft 30. As may be seen in FIG. 2A, the driving pawl 32 is mounted on link 51 and is adapted to be rotated therewith relative to shaft 30.

By proper selection of sprockets, the upper drive shaft 46 which is connected to sprocket wheel 44 and by chain 45 to sprocket wheel 43 makes one revolution per cycle of the machine. When the shaft 46 rotates, the eccentric cam 47 is adapted to be engaged by the cam follower 48 and thus move the operating arm 49 to the left as viewed in FIG. 2A, thereby causing the pawl 32 to be rotated in a counterclockwise direction around shaft 30 by link 51. Since the pawl 32 is in engagement with the teeth of ratchet wheel 31, the latter will be caused to rotate in a counterclockwise direction as will the shaft 30 to which the ratchet wheel 31 is secured. This rotation causes the worms 29 on the shaft 30 to rotate, thereby driving the respective worm wheels 28 which are secured to the respective shafts 27 which carry the sprocket wheels 25. This action causes the endless chains 21 to move, thereby raising the angle members or brackets 22 which support the tray 20, FIG. 1, which, in turn, raises the top of the stack of blanks sb, as the blanks are withdrawn therefrom.

As may be seen in FIG. 2A, the elevating trays tilt the center of gravity of the stack of blanks in towards the staying machine. This prevents the shifting of a high pile of blanks which, in some cases, may be as high as 48″. This is particularly desirable in connection with small blanks, which in some instances may be as small as approximately 2″ x 4″. The pile or stack of blanks is further controlled by guides 52, FIGS. 2A, 3, which are adapted to be automatically adjusted to proper position when the table of the staying machine is changed for a different size of blanks. The machine is adapted to handle blanks of a wide range of sizes and is capable of handling blanks as small as approximately 4″ long and 2″ wide up to approximately 31″ long by 25″ wide.

To remove the outermost blanks individually from the stack, there is provided a floating gate which cooperates with blank-advancing means, such as one or more vacuum cups, in a novel manner now to be described. As may be seen in FIGS. 2A and 5, the floating gate comprises an upper member 55 and a lower member 56 adapted to be carried at the outer ends of a pair of spaced arms 58. The opposite ends of the arms 58 are connected to brackets 53 which are adapted to be pivoted at 53a, against the bias of springs 54, to supports 57 adjacent opposite side walls of the machine frame. The upper gate member 55 includes a narrow lip or flange portion 55a which is adapted to rest on the top of the stack of blanks sb. The raised projection 56a on lower gate member 56 is adapted to be spaced below the lip 55a of the upper gate member 55 a distance corresponding to the thickness of the blanks b being fed. It will be noted that the gate assembly is free to ride up and down on the stack of blanks sb and will pivot about the point 53a. The spacing between the narrow lip 55a and projection 56a respectively on the upper and lower gate members 55 and 56 is adjusted at the start of a run for the particular thickness of the blanks b. The spacing is sufficient to permit only one blank to pass therebetween at a time.

The mechanism for operating the floating gate comprises a pair of cams 66 which is keyed to the one revolution shaft 46 adjacent the opposite ends thereof and which is adapted to be engaged by cam followers 67 carried by bell cranks 68 which in turn are pivotally carried by a connecting shaft 69, FIG. 5. The bell cranks 68 are connected to the lower member 56 of the floating gate by pull rods 71 and are adapted to maintain the gate at the proper height during the feeding cycle. The springs 72 which are carried by the lower ends of the pull rods 71 between the collars 73 and the supporting brackets 74 on the gate member 56 provide a cushion action.

As shown in FIGS. 2A, 3 and 5, the arms 58 are channel-shaped in cross section and include a second channel portion 58a at their outer ends. The channel portions 58a are adapted to receive cam rollers 60a carried at the outer ends of a pair of arms 60. The arms 60 are secured at their opposite ends to a hollow tube 59 to which suction is applied by way of a hose 61, FIGS. 3 and 5, which is adapted to be connected to a vacuum pump 62, shown in FIG. 2A. The tube 59 is provided with one or more suction cups 63, depending upon the size of the blanks being fed from the stack. The tube 59 has openings therein for each of the suction cups 63 and it is provided with suitable connectors 65 for the two outer suction cups 63 so that they may be adjusted lengthwise of the tube 59 to accommodate blanks of different sizes. The center suction cup 63 need not be moved for different size blanks and when small blanks are being fed, the two outer suction cups 63 may be eliminated.

The shaft 69 is adapted to be pivoted by an arm 75, which is keyed thereto, and is provided with a cam follower 76 which is adapted to engage an eccentric cam 77 carried at the left hand end of the upper drive shaft 46, as shown in FIG. 5. The pivotal movement of the shaft 69 imparts an arcuate movement to the suction tube 59 pivotally supported by means of a pair of swinging arms 80 which are keyed to the shaft 69. The ends of the shaft 69 are adapted to be journalled on the side frames of the machine. From the foregoing, it will be seen that arms 60, with their cam rollers 60a, serve as a tie-in between the height of the gate 55—56 and the height of the vacuum cups 63.

During each cycle of the machine, the drive shaft 46 rotates through one complete revolution and the upper member 55a of the gate and the suction cups 63 move into engagement with the outermost blank in the stack. The suction cups 63 by reason of their pivotal position cause the front or leading edge of the blank to move forward between the gate members 55 and 56 through the sized opening at 55a and 56a and continued rotation of the shaft 46 causes the suction cups 63 and the gate members 55 and 56 to raise concurrently and move the leading edge of the sheet in an advancing direction between the pair of feed rollers 81, 82, FIG. 2A of the staying machine. The feed rolls 81, 82 are continuously driven and cause the separated blank to be drawn through the space between the gate members 55 and 56 and thence into the blank folding and staying portion of the machine 12, as shown in FIG. 2B. The drive for the feed rolls 81, 82, FIG. 2A, is by way of a sprocket wheel 85, which is fixed to the shaft of roll 82, chain 86, sprocket wheel 87 which is keyed to a stub shaft 88, another sprocket wheel 89 which is also keyed to stub shaft 88 behind sprocket wheel 87 as viewed in FIG. 2A and a chain 90 which passes around sprocket wheel 89 and a sprocket wheel 91, the latter being fixed to the continuously driven shaft 38, FIG. 2C.

It will be noted, FIG. 5, that in suction line 61 there is a vacuum valve 95 which is adapted to control the suction to the tube 59 and thus to the suction cups 63. The vacuum valve 95 is adapted to be operated by arm 75 which in cooperation with the eccentric cam 77 and the cam follower 76 cuts off the suction to the suction cups 63 by opening the valve 95 to atmosphere in each cycle of the machine after the leading edge of the sheet has been inserted between the feed rolls 81 and 82. The valve 95 is closed to atmosphere when the suction cups 63 move into engagement with the next outermost sheet of the stack to be fed in the succeeding cycle.

As the sheets are fed from the top of the stack of blanks, the overall height of the stack of blanks will be decreased and thus it is necessary to elevate the stack so as to maintain the outermost sheet in an area or zone substantially level with the space or pinch point between the feed rolls 81 and 82. This elevating action is provided by the cooperation of the actuating arm 49 and pawl 32 which causes the associated ratchet wheel 31 to rotate worm shaft 30 and thus move the associated worm wheels 28 and chains 21 to raise the stack of blanks. It is to be understood that the normal operation of the stack-elevating mechanism will prevent the stack from becoming too low because each advancement of the ratchet wheel will raise the stack a distance corresponding to the thickness of several sheets whereas only one sheet is being removed from the stack during each cycle. To insure that the stack is not raised too high and thus place the outermost sheet in the stack above the predetermined zone for proper feeding, there is provided means for sensing the height of the stack of unused blanks, as now to be described.

A switch 100, FIG. 5, the contacts of which are normally closed, is mounted on the frame of the machine in a position relative to one of the supporting arms 58 for the floating gate. The switch 100 detects when there has been an excessive amount of travel by the gate indicating when the top of the stack of blanks is too low. The excessive amount of travel of the gate permits the contacts of normally closed switch 100 to open thereby deenergizing the coil of a magnet 102, which is also mounted on the frame of the machine and is adapted to be normally energized from a source of power L–1, L–2. When the magnet 102 is deenergized, it has no effect on the metal block 103 which is secured to the actuating arm 49, as is one end of a return spring 104, FIG. 2A. The opposite end of the return spring 104 is secured to the frame of the machine at 106. When the eccentric cam 47 rotates during each cycle, it normally moves against the cam follower 48 causing the operating arm 49 to move to the left, as viewed in FIGS. 2A and 5, against the bias of return spring 104. When the cam follower 48 engages the low portion of cam 47, the return spring 104 moves arm 49 back to the position shown in FIG. 2A. During this operation, the ratchet arm 51 causes the pawl 32 to pass over several teeth of the ratchet wheel 31. On the next half revolution of eccentric cam 47 the roller 48 will impart motion through arms 49 and 51 to pawl 32 which will rotate the ratchet wheel 31, and thus elevate the stack in the manner previously described. However, when the contacts of the sensing switch 100 are closed, indicating that the stack is sufficiently high, magnet 102 is energized and the block 103 is held against the magnet 102 thereby preventing the return spring 104 from moving the actuating arm 49 to the right. This prevents the pawl 32 from picking up another notch on the ratchet wheel 31. From the foregoing, it will be seen that this action prevents the stack from being raised by the chains 21 and this status is maintained until the movement of the floating gate is such as to open the contacts of the sensing switch 100 and thereby deenergize the magnet 102.

Figure 4A:
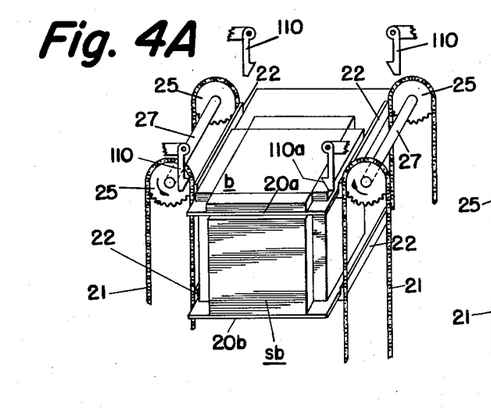
FIGS. 4A and 4B are schematic views illustrating the tray storage as viewed from the leading edge of the blanks.
Figure 4B:
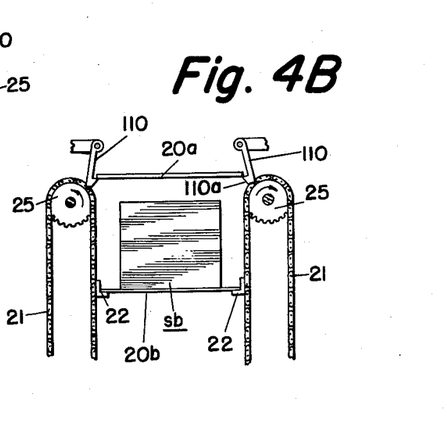

The present invention enables transfer to be made from one tray of sheets to another when the sheets on the first tray have been depleted and without the aid of an operator. This has been schematically illustrated in FIGS. 4A and 4B. As the chains 21 advance, the trays 20a and 20b are raised until all of the sheets or blanks b have been removed from the upper tray 20a. When this takes place, the tray supports 22 move around the upper sprocket wheels 25, causing the empty tray 20a to move against the lower cam surfaces 110a on the latching members 110, FIG. 4B, and against the latching members 110 which are pivotally carried by the frame of the machine. The lower ends 110a of the latching members 110 are rotated out of the path of the empty tray 20a and as the tray moves to a predetermined height, the shoulders on the latching members move beneath the tray 20a into supporting position. The supporting position corresponds to the original position of the latching members 110, as shown in FIG. 4A. The latching members 110 are counter-weighted to facilitate their return to the original position. After the tray 20a has been stored on the supporting members 110, the chains 21 continue to advance thereby moving the succeeding tray 20b upwardly so that the sheet material or blanks can be fed therefrom. This operation continues until the blanks are depleted from tray 20b at which time it moves to a stored position on the latching members 110. The latching members 110 are adapted to store a plurality of empty trays and thus it is not necessary for an operator to remove each tray from the stored position after it has been emptied, but instead the operator may wait and remove several trays at one time.

When the sheets are fed by suction members, such as the suction cups 63, FIG. 5, the trays 20 are provided with a series of notches *d–h* along their forward edge to permit the suction cups 63 to pass through the tray when it is in stored position, thus permitting the suction cups to continue the feeding of the sheets from the next tray without interruption. When small size blanks are being fed, it is only necessary to use the center suction cup 63 which will pass through notch *f*. For medium size and large size blanks, it is preferable to use three suction members 63. For the medium size blanks, the outer suction member 63 will pass through the notches *e* and *g* respectively and for the large size blanks, the outer suction members 63 will be moved to their outer positions for passage through notches *d* and *h* respectively. For other types of feeding mechanisms which do not require passage through the stored trays, such for example as a pushing member positioned to the rear of the stack, it will be understood that the trays 20 need not be provided with the notches mentioned above.

After the leading edge of the outermost sheet of the stack is inserted between the gate members 55 and 56 by the suction members 63, the sheet is drawn completely through the gate in a continually advancing direction by the feed rolls 81 and 82. The feed rolls 81 and 82 deposit the blank on a pair of spaced guide rails 145, FIG. 2B. From here the blank is transported by a feed chain 115, FIG. 2A, which is provided with a pusher link 116 which engages the trailing edge of the blank *b* and moves it to forming position beneath the plunger for the form, which is carried by the cross head 15 and slide rod 16. The feed chain 115 is continuously driven from the main drive shaft 38 and provision is made for timing the position of the pusher link 116 so it will bring the blank to the forming position at the proper time. To compensate for different sizes of blanks, the weight 117, at the lower end of the chain 115 and which carries the tightener sprocket 118, is adapted to be raised or lowered, as may be required. As the pusher link 116 moves around the stripper members 119, the blank *b* is moved to its proper position beneath the plunger and out of engagement with the pusher link 116.

Figures 5A, 5B:
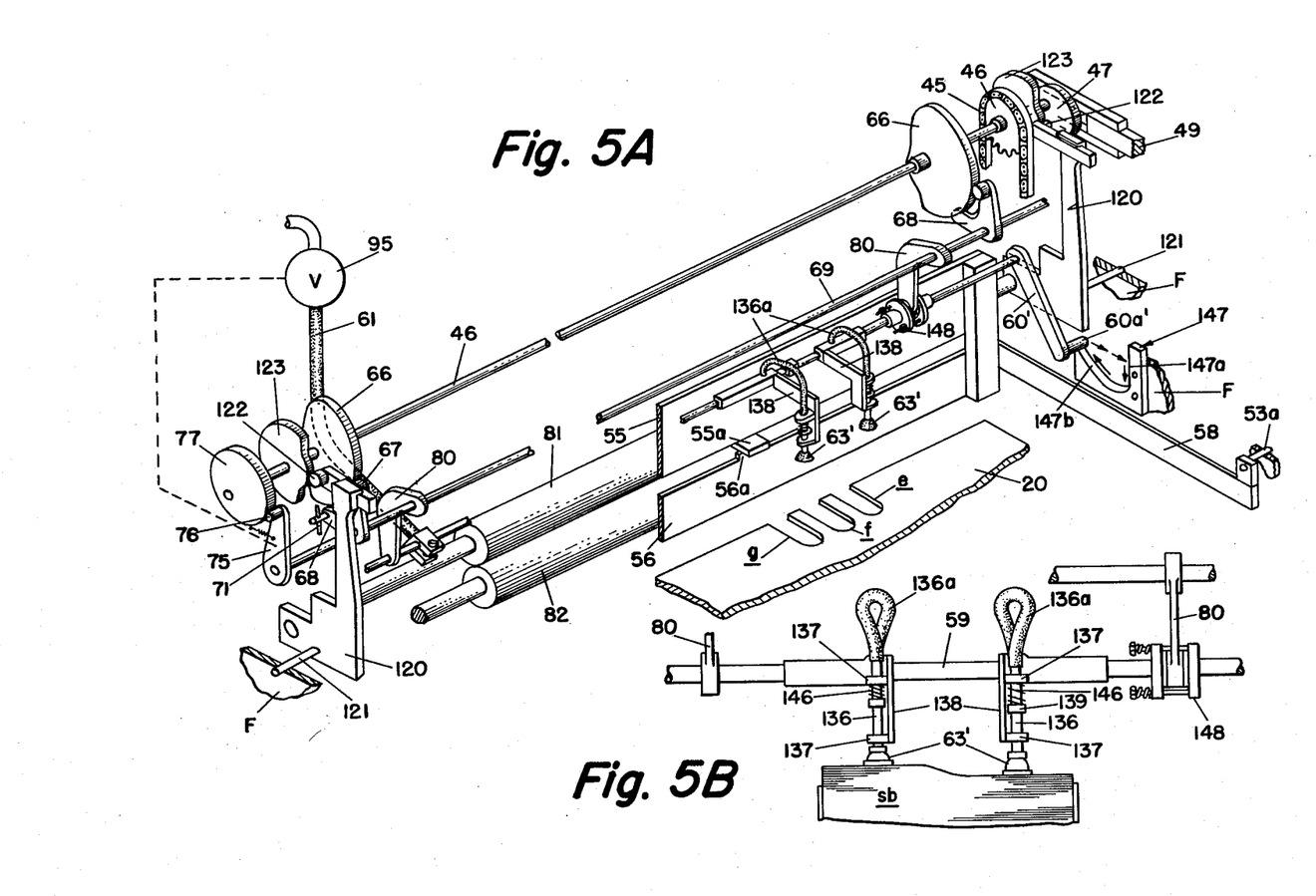
FIG. 5A is a modification of the sheet transfer mechanism shown in FIG. 5.
FIG. 5B is a fractional view of the modification shown in FIG. 5A.

The sheet transfer mechanism disclosed in FIG. 5 has proved satisfactory in operation; however, it does require close control of the timing cycle and accurate positioning of the blanks in order to prevent a blank from being fed at the wrong time in relation to the plunger cycle or the suction-cup cycle. In order to relieve the foregoing requirements and insure that a blank is not fed at the wrong time, provision has been made in FIG. 5A for lifting the top feeding roll 81 so that it does not contact the blank during the time when the suction cups are feeding it forward. As may be seen in FIG. 5A, the ends of the top feed roll 81 are journalled in lever arms 120 which are pivoted at their lower ends to frame F for rotation about the pivot 121. The lever arms 120 are provided at their upper ends with a cam roller 122 which is adapted to engage the surface of cams 123 carried by the rotating shaft 46. The cams 123 are so shaped as to pivot the arms 120 about their pivot members 121 and thereby raise the upper feed roll 81 with respect to the lower or driven feed roll 82. The shape of the cams 123 insures that the upper feed roll 81 is brought into contact with the lower feed roll 82 at such a time when the blank can be forwarded into forming position beneath plunger 15 only when the plunger 15 is in its raised position. The feeding of the unformed blank from the stack *sb* taking place only during the time when the feed rolls 81 and 82 are open. This arrangement has several advantages, as will now be pointed out. By bringing the leading edge of the unformed blank *b* into the point of feed roll tangency at a time when the feed rolls 81 and 82 are apart and thus do not grip the blank enables the vacuum cups 63' to be released and raised out of the path of blank travel while the blank is stationary. This minimizes wear on the vacuum cups. A second advantage derived from this arrangement is the fact that the unformed blanks *b* are allowed to penetrate further into the feed rolls before the vacuum cups are released, thereby insuring that the feed rolls 81 and 82 will engage the leading edge of the blank and thus continue its movement towards the forming position beneath the plunger 15. A third advantage can easily be visualized as occurring whenever the blank at the top of the supply stack *sb* is forward from its normal position in the pile at the time when the vacuum cups pick it up. Since the forward stroke of the vacuum cups is uniform for each cycle, this will result in the leading edge of the blank being received between the feed rolls 81 and 82 before the vacuum cups reach the end of their normal forward stroke. By providing a feed-roll operating arrangement, as shown in FIG. 5A, which insures that the feed rolls will be in open position when the blank is moved therebetween by the suction cups, it will be seen that the blank can be fed between the feed rolls 81 and 82 without danger of their tearing it away from the cups prematurely and as a result having the blank jammed into the form. While the lifting mechanism for the feed roll 81 has been shown in FIG. 5A, it is to be understood that the mechanism is equally applicable to the arrangement shown in FIG. 5 for use in conjunction with the suction members 63.

As shown in FIG. 5, the plurality of suction cups 63 are all maintained within the same plane and adapted to engage the top sheet of the stack. This arrangement is very successful so long as the top of the stack is flat and in a plane parallel to the plane of the suction cups 63. In practice, it has been found that the top of the stack of blanks is frequently irregular, either due to the curling of the individual blank or due to a differential in the bulk of various parts of the stack. To overcome this condition, there is shown in FIGS. 5A and 5B an arrangement which allows each of the suction cups 63' to adjust itself to the top of the stack. Each of the suction cups 63' is carried at the lower end of a tubular member 136 which is adapted to slide through openings in a pair of supporting members 137, which in turn are carried by arms 138 mounted on the suction tube or pipe 59. The upper ends of the tubes 136 are connected to the suction pipe 59 as by flexible hose 136a. Each of the tubular members 136 is provided with a collar 139 and a coil spring 146 which is adapted to be mounted on the tubular member 136 between the collar 139 and the upper support 137. When the suction cups 63' are out of engagement with the stack of blanks *sb*, the suction members 63' are all in the same plane, as shown in FIG. 5A. However, when the suction cups 63' are moved into engagement with the top of the stack of blanks *sb* and there is irregularity of the surface, the suction cups 63 will adjust themselves individually to the height of the stack *sb* in the manner shown in the fractional view, FIG. 5B. The difference in elevation of the top blank has been exaggerated to show how each of the suction cups 63' will seek its own level and, as will be noted in connection with the left-hand suction cup 63', the spring 146 has been compressed to a substantial degree between the upper support 137 and the collar member 139. After the outermost blank has been raised by the suction cups 63' from the top of the stack *sb*, the suction cups 63' will again move to a uniform plane and thus feed the sheet or blank to the proper position through the gate 55a–56a and between the feed rolls 81 and 82.

In the preferred modification shown in FIG. 5A, the movable cam track 58a, FIG. 5, which received the cam roller 60a has been replaced by a fixed cam 147, FIG. 5A, which is secured to the side frame of the machine. The cam 147 is adapted to be engaged by a cam roller 60a' which is carried at the lower end of the arm 60', the upper end of which is secured to the end of the suction tube 59. With the parts in the position shown in FIG. 5A, the suction cups 63' have just completed delivery of a sheet or blank b to a position between the feed rolls 81 and 82. The vacuum has been released so as to disengage the suction cups 63' from the blank b and the feed rolls 81 and 82 have been moved together to proceed with delivery of the blank to the forming position. The suction cups 63' follow a substantially triangular-shaped path as indicated by the arrows adjacent cam 147 and cam roller 60a'. The position of the suction cups 63' is directly opposite the cam roller 60a' similar to the positions of cups 63 and cam roll 60a shown in FIG. 2A, and thus the paths of the suction cups 63' and the cam roller 60a' are substantially the same. It will be recalled from the previous description that the pipe 59 is pivotally carried at the lower ends of members 80. The desired movement for the suction cups 63' is for them to move back and then downward into engagement with the outermost blank b and then to move forward in a diagonally upward direction to move the leading edge of the blank through the projections 55a and 56a of the gate members 55 and 56. To maintain the position between the pivot arms 80 and the pipe 59, there is provided a friction brake 148 which holds the suction cups 63' in their up position, shown in FIG. 5A, until the cam roller 60a' contacts the vertical portion 147a of cam 147. Since the friction brake 148 maintains the position between the pivot arm 80 and the pipe 59, the path of movement of the suction cups 63' and the cam roller 60a' is on a slight arc about shaft 69 as the axis. Since the distance of movement is relatively small and the radius of curvature is relatively large, the path of movement closely approximates a straight line. When the cam roller 60a' engages the vertical surface 147a of cam 147, the arm 60', which is secured to pipe 59, causes the latter to rotate, thereby overcoming the friction of the brake 148. As the cam roll 60a' moves down the vertical surface 147a, the suction cups 63' are forced down until firm contact is made with the uppermost blank in the stack. When the cam roller 60a' reaches the lower end of the vertical cam surface 147a, both the cam roller 60a' and the suction cups 63' start their forward movement which is controlled by the upwardly sloping surface 147b of cam 147. At the completion of the forward motion, the suction cups 63' and the cam roll 60a' are in the position shown in FIG. 5A and the mechanism is ready to repeat the foregoing cycle while the previous blank is being fed by rolls 81 and 82 to the forming position beneath plunger 15.

The plunger 15, FIG. 1, is adapted to be reciprocated vertically by means of a lever arm 124, FIGS. 2B and 2C, which is pivoted at 125 to one side of the frame F of the machine, the other end of lever 124 being connected by a link 126 to the lower end of slide rod 16. The lever arm 124 is adapted to be pivoted about its pivot 125 by means of a cam 127 which is adapted to be engaged by a cam follower 128 carried intermediate the ends of the lever arm 124. The lever arm 124 is biased in a downward direction by a pair of springs 129 which are connected at their upper ends to the lever arm 124 and at their lower ends to the frame of the machine. The cam 127 is secured to a shaft 130 which is journalled at its ends in the opposite sides of the machine frame. The shaft 130 is adapted to be continuously driven and the drive for shaft 130 is derived from the main drive shaft 38 by way of a gear 131 which meshes with a gear 132 carried by a cross shaft 133 which in turn carries a gear 134 which is adapted to mesh with a gear 135 secured to the shaft 130.

In order to operate the machine, but at the same time to prevent the plunger 15 from being actuated, there is provided a lever 140, FIG. 2B, which is pivotally supported at 141 and is provided with a projection 142 adapted to engage the outer end of lever arm 124 and prevent the springs 129 from causing the cam roller 128 to follow the surface of cam 127. This will hold the lever arm 124 in its raised position as shown in FIG. 2B, thus preventing the slide rod 16 from being reciprocated. With this arrangement, the remaining portions of the machine can continue to be operated from the main drive motor M while the plunger and form for the boxes are remaining inactive in the raised position.

To permit the plunger to be operated, the lever 140 is moved to the right about its pivot 141 thereby moving the projection or stop 142 out of engagement with the end of lever arm 124. The cam roller 128 on lever arm 124 is then free to follow the cam 127 and cause the plunger form to move downwardly against a box blank which is supported on spaced guides 145 therebeneath. The blank b then moves downwardly past bending rails, FIG. 2B, which causes the side walls of the box to be moved to a vertical position $B_1$ against the sides of the form on the plunger. While the box is in position $B_1$, FIG. 2B, stay tape is applied to each of the corners of the box by corner stay pressers which are adapted to be reciprocated by pressure bars actuated from yoke-shaped levers 150 and 151, FIG. 2C. The pressure levers 150 and 151 are similar to the pressure levers shown in the aforesaid Davis et al. patent; however, both levers are disposed at the same end of the machine. The upper ends of the levers 150, 151 are pivoted to a stationary portion of the machine at pivot 154. Each lever 150 and 151 is operated respectively from an eccentric 156 and 157 on the shaft 133, through the intervention of a strap and rod 158, 159, applied to the respective eccentrics 156, 157, the respective rods 160, 161, pivotally connected with the lower portions of the respective levers 150, 151, and springs 162, 163 which are compressed between the respective straps and rods 158, 159 and the collars 164, 165 on the respective rods 160, 161. It will be noted that the eccentrics 156 and 157 are displaced from each other 180° about the axis of shaft 133. This arrangement is necessary because both pressure levers 150 and 151 are at the same end of the machine. However, one of these levers operates corner stay pressers which are located at the opposite end of the machine. It is of course understood that in staying machines of the quad type, all four corner pressers are concurrently moved towards the center of the box and into engagement with the respective corners.

The stay tape length is adapted to be controlled from a single position on the machine by control lever 170 on the stay feed mechanism 171. The change in stay tape length from one box size to another can be accomplished quickly and it will be assured that all four corners will have uniform stay length. The stay feed mechanism 171 is adapted to be actuated by a bar link 172, the lower end of which is connected at 173 to an eccentric 174 carried by shaft 130. When a blank is picked up by the suction member 63, FIG. 2A, a connecting pin 175, FIG. 2C, is drawn into a mating hole in the bar link 172 and the motion of the eccentric 174 is transmitted to the stay feed mechanism 171 and stay strips are applied to the box B which is formed from the blank b. However, if no blank is fed by the suction member 63, the pin 175 does not connect the bar link 172 to the eccentric 174 and thus no stay strips are fed during this cycle of the machine. This is what is known in the trade as no blank-no stay control and eliminates stay tape from being built up on the form when the machine is running and no boxes are being produced.

After the set-up box B has been completed, as above described, it is removed from the form on the plunger and deposited on the conveyor 11 which is disposed therebeneath. As may be seen in FIGS. 2B, 2C, 6 and 7 the conveyor 11 is carried by a sub-frame 181 which is slidably mounted on a pair of rods 182 and 183 secured to the side frames of the machine. The frame of the conveyor 11 comprises a pair of channel-shaped side rails 185, 186 which are joined together intermediate their ends by cross plates 187 and 188. The cross plate 187 is pivotally connected to the sub-frame 181 by a central pivot 189, FIGS. 6 and 7. The inner end of the conveyor 11 is provided with a roller 190 carried by a shaft 191, which extends through the side rails or channel members 185 and 186. The extending portions of the shaft 191 are provided with pulleys 192 and 193, the purpose of which will hereinafter be described. Projecting from the opposite ends of the side rails 185 and 186 is a collapsible section of the conveyor which comprises a pair of channel-shaped side members 195 and 196, the inner ends of which are adapted to telescope within the side rails 185 and 186 and slide on rods 197 and 198 which interconnect the side rails 185 and 186. The side members 195 and 196 of the extending portion of the conveyor are connected by cross members 200, 201 and 202. The outer ends of the side rails 195 and 196 support a roller, 204. An endless conveyor belt 205 is adapted to pass around the inner end roller 190 and the outer end roller 204 and over an intermediate roller 206 which is carried by the rod 198.

Figure 6:
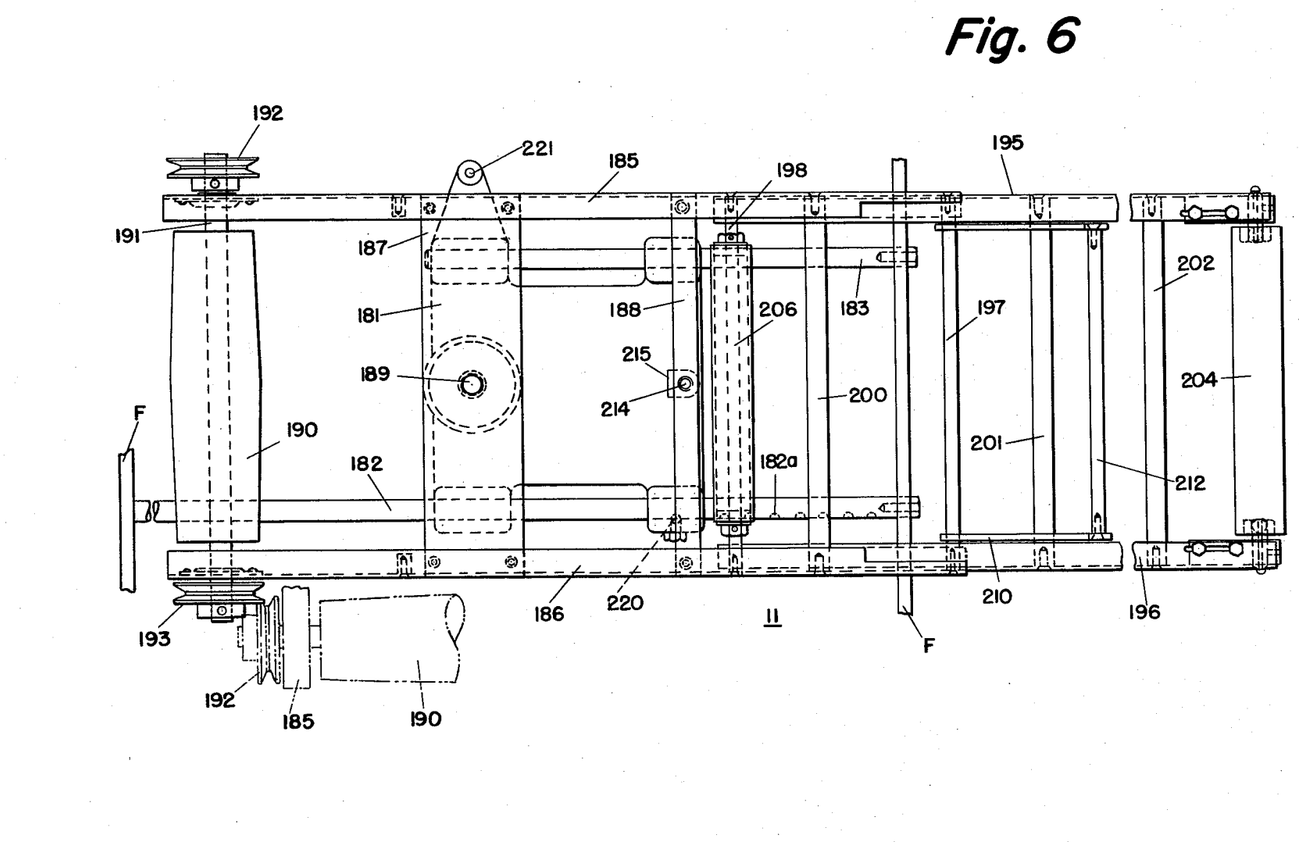
FIG. 6 is a top plan view of the pivotal conveyor shown in FIG. 1.
Figures 7, 8:
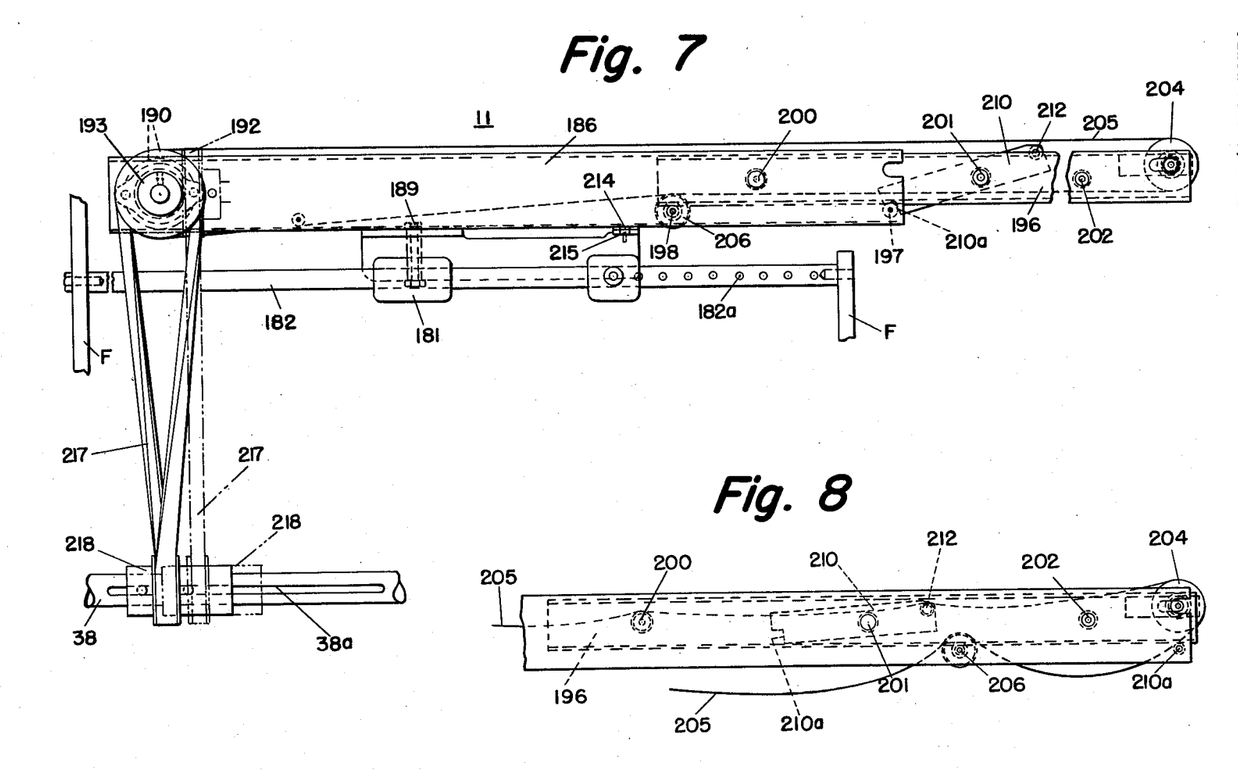
FIG. 7 is a side elevation of the pivotal conveyor shown in FIG. 6.
FIG. 8 is a view of the conveyor in a telescoped position.

As illustrated in FIGS. 6 and 7, the collapsible conveyor 11 has been shown in extended position with the discharge end projecting from the side of the frame F of the machine. This is similar to the full line position of the conveyor, as shown in FIG. 1. The collapsible section of the conveyor is maintained in extended position by means of a latch 210 which is pivoted on cross rod 201. The latch 210 is provided with a notch 210a at the inner end thereof which is adapted to engage the cross rod 197 interconnecting the outer ends of the side rails 185 and 186. To release the latch 210, there is provided an operating bar 212 which is positioned beneath the upper run of the conveyor belt 205 and when displaced, rotates the latch 210 in a clockwise direction, as viewed in FIG. 7, thereby moving the notches 210a out of engagement with the bar 197. This permits the outer section of the conveyor 11, including the side rails 195 and 196, to be telescoped within the main side rails 185 and 186 thereby shortening the overall length of the conveyor 11.

The conveyor 11 is adapted to be held in the position shown in FIGS. 6 and 7 by means of indexing means 214 and 215 respectively carried by the cross member 188 and the sub-frame 181. The indexing means insures that the conveyor 11 will extend perpendicular to the side frame of the machine. This is the position in which the conveyor 11 is adapted to deliver boxes out the side of the staying machine to an operator of a semi-automatic wrapping machine. The discharge end of the conveyor may be adjusted to suit the reach of the particular operator by merely pushing or pulling on the ends of the side frames 195 and 196 adjacent the outer roller 204. The sub-frame 181 for the conveyor 11 is slidably carried on cross rods 182, 183 as previously described. The drive for the conveyor is obtained from the main drive of the staying machine by way of pulley 193, belt 217 and splined pulley 218 on the main drive shaft 38. It will be noted that the pulley 218 is of substantial length and is adapted to slide lengthwise of shaft 38 within the groove 38a, FIG. 7. By reason of this construction, the pulley will automatically move lengthwise of shaft 38 a distance corresponding to the movement imparted to the end of the conveyor 11 when it is adjusted by the operator. This adjustment can be made while the machine is operating and without the need of any tools. To maintain the conveyor 11 in its adjusted position, the cross rod 182 is provided with a series of indexing grooves 182a which are adapted to cooperate with indexing means carried by the sub-frame 181. The indexing means has been illustrated as a spring-loaded ball 220, FIG. 6, which is adapted to be received in the indentations or grooves 182a in cross rod 182.

To turn the conveyor 11 for discharge of boxes from the end of the staying machine, as shown in phantom lines in FIG. 1, the latching means 210 is released and the end of the conveyor collapsed in the manner above described so that the side rails 195 and 196 and the end roller 204 will be moved to the telescoped position shown in FIG. 8. The belt 217 is then removed from pulley 193 and the conveyor 11 pivoted in a counterclockwise direction about the pivot 189 on sub-frame 181 until the indexing member 214 on cross member 188 engages the cooperating indexing member 221 on the sub-frame 181 and which member 221 is positioned at an angle of 90° from the indexing member 215 used for the side discharge position of the conveyor. With the conveyor 11 in this position, the pulley 192 will have been moved to the phantom line position, shown in FIGS. 6 and 7 and directly over the drive pulley 218. The belt 217 can then be placed over the pulley 192 and the conveyor 11 is ready to discharge boxes from the end of the staying machine, as shown by the phantom line position of the conveyor 11 in FIG. 1. This novel pivoted construction of the discharge conveyor 11 permits the conveyor to be driven from the main source of power M of the staying machine and enables the set-up boxes B to be discharged from either the side or end of the machine as desired. The change in discharge positions of the conveyor is accomplished without the need of any tools and in less than one minute. The novel drive arrangement for the conveyor 11 from the main source of power of the machine eliminates the need for an auxiliary source of power and at the same time enables the discharge end of the conveyor to be readily moved to any desired position for the convenience of the operator.

While a preferred embodiment of this invention has been illustrated, it is to be understood that other modifications thereof may be made within the scope of the appended claims.

What is claimed is:

1. Apparatus for feeding sheet material from a stack comprising floating gate means including a pair of members spaced apart a distance corresponding to the thickness of only one of the sheets, a pivotal support for said floating gate means, means for moving said floating gate means about its pivotal support and into engagement with an outermost sheet of the stack adjacent the leading edge thereof, and means for moving the leading edge of only the outermost sheet through the spacing between said pair of members of said floating gate means to positively separate only the outermost sheet from the stack.

2. Apparatus for feeding sheet material according to claim 1 including a pair of feed rolls, said floating gate means and said sheet-moving means being concurrently operable to move the separated sheet between said feed rolls.

3. Apparatus for feeding sheet material according to claim 1 wherein said sheet-moving means comprises a suction member for applying suction to the outermost sheet.

4. Apparatus for feeding sheet material according to claim 2 wherein said sheets are stacked on a tray, means for raising said tray as the sheets are removed therefrom and the height of the stack decreased so as to maintain the outermost sheet of the stack within a predetermined area relative to said feed rolls and said floating gate means.

5. Apparatus for supplying sheet material to a machine comprising elevating conveyor means, tray means removably carried by said elevating conveyor means and adapted to support sheet material in a vertical stack thereon, means for operating said elevating conveyor means to elevate said tray means from a lower position to an upper position on said elevating conveyor means during withdrawal of the sheet material therefrom, and tray storing means disposed adjacent said conveyor means for automatically removing said tray means from its upper position on said elevating conveyor means after removal of the sheet material therefrom.

6. Apparatus for supplying sheet material to a machine comprising elevating conveyor means, tray means carried by said elevating conveyor means and adapted to support sheet material in a vertical stack thereon, means for operating said elevating conveyor means to elevate said tray means for withdrawal of the sheet material therefrom, means positioned above said tray means and in line therewith for withdrawing sheet material therefrom, tray storing means disposed adjacent said elevating conveyor means for automatically removing said tray means therefrom in a stored position after removal of the sheet material thereon by said sheet withdrawing means, said tray means having aperture means therein in alignment with said sheet-withdrawing means whereby the latter may pass through said tray means when said tray means is in the stored position to withdraw sheets from another tray carried by said elevating conveyor means.

7. Apparatus for supplying sheet material to a machine according to claim 6 wherein said sheet-withdrawing means comprises at least one suction member and said tray means has at least one slot therein for passage of said suction member therethrough.

8. Apparatus for supplying sheet material according to claim 6 including a plurality of suction members, said suction members being adjustable to different positions transversely of said tray means for operating on sheet material of different size, and said tray means has slots therein at different positions extending transversely of said tray means for alignment with the different positions of said suction members.

9. Apparatus for feeding sheet material from a stack of sheets comprising floating gate means including a pair of members spaced apart a distance corresponding to the thickness of only one of the sheets, a pivotal support for said floating gate means, means for moving said floating gate means about its pivotal support and into engagement with an outermost sheet of the stack adjacent the leading edge thereof, a pair of feed rolls adjacent said floating gate means, means for moving the leading edge of only the outermost sheet material through the spacing between said pair of members of said floating gate means and between said feed rolls, and means operable in timed relation with said sheet-moving means for controlling the spacing between said feed rolls.

10. Apparatus for feeding sheet material from an end of a stack of sheets to a machine having feed rolls comprising suction means disposed adjacent the end of the stack and adapted to engage an outermost sheet at the end of the stack and apply suction thereto, and means for guiding said suction means in a predetermined path substantially triangular in shape, said suction means moving from an initial position along a plane substantially parallel to and spaced from the outermost sheet at the end of the stack then into engagement with the outermost sheet followed by return movement with the outermost sheet in a diagonal direction to the initial position to move the leading edge of the outermost sheet between the feed rolls.

11. Apparatus according to claim 10 including means associated with said suction means to enable the latter to adjust itself to the elevation of the outermost sheet of material.

12. Apparatus according to claim 10 wherein said suction means is carried by a pivotal member, and said means for guiding said suction means comprises an arm secured to said pivotal member, a cam roller carried by said arm, and a stationary cam supported for engagement by said cam roller, said cam having a pair of surfaces corresponding to two sides of the triangular path of said suction means.

13. Apparatus according to claim 12 including means effective on said pivotal member for restraining pivotal movement thereof so as to maintain said suction means in a plane substantially parallel to the outermost sheet during the initial movement of said suction means through its predetermined path.

14. Apparatus for feeding sheet material from a stack of sheets aligned in a vertical direction to a machine having feed rolls comprising suction means disposed adjacent the end of the stack and adapted to engage the top sheet and apply suction thereto, and means for guiding said suction means in a predetermined path above the stack of sheets, said path being substantially triangular in shape, said suction means moving from an initial position along a plane substantially parallel to and spaced above the top sheet of the stack then downwardly into engagement with the top sheet followed by return movement with the top sheet in an upward-diagonal direction to the initial position to move the leading edge of the top sheet between the feed rolls.

References Cited in the file of this patent

UNITED STATES PATENTS

| | | |
|---|---|---|
| 677,062 | Combs | June 25, 1901 |
| 930,702 | Sprowles et al. | Aug. 10, 1909 |
| 1,457,830 | Gerhardt | June 5, 1923 |
| 2,184,296 | Goebel et al. | Dec. 26, 1939 |
| 2,199,170 | Goebel et al. | Apr. 30, 1940 |
| 2,817,521 | Koch | Dec. 24, 1957 |
| 2,900,186 | Schwebel | Aug. 18, 1959 |

UNITED STATES PATENT OFFICE
CERTIFICATE OF CORRECTION

Patent No. 3,016,240                       January 9, 1962

Sherman W. Twitchell et al.

It is hereby certified that error appears in the above numbered patent requiring correction and that the said Letters Patent should read as corrected below.

Column 14, list of references cited, under "UNITED STATES PATENTS" insert the following references:

```
1,687,289  Feeley----------------Oct.  9, 1928
1,715,585  Woodworth-------------June  4, 1929
2,137,381  Blackstone------------Nov. 22, 1938
2,225,007  Gudger et al.---------Dec. 17, 1940
2,265,617  Yates-----------------Dec.  9, 1941
2,268,300  Pearson---------------Dec. 30, 1941
2,641,973  Straw-----------------June 16, 1953
2,721,737  Hammer et al.---------Oct. 25, 1955
2,749,118  Kerr et al.-----------June  5, 1956
```

Signed and sealed this 28th day of August 1962.

(SEAL)
Attest:

ESTON G. JOHNSON                       DAVID L. LADD
Attesting Officer                    Commissioner of Patents